United States Patent
Fujiwara

(10) Patent No.: US 7,800,664 B2
(45) Date of Patent: Sep. 21, 2010

(54) DIGITAL PHOTOGRAPHIC INSTRUMENT, METHOD FOR ADJUSTING FOCUS OF DIGITAL PHOTOGRAPHIC INSTRUMENT, AND PROGRAM FOR DIGITAL PHOTOGRAPHIC INSTRUMENT

(75) Inventor: Hideki Fujiwara, Matsudo (JP)

(73) Assignee: Nokia Corporation, Espoo (FI)

( * ) Notice: Subject to any disclaimer, the term of this patent is extended or adjusted under 35 U.S.C. 154(b) by 930 days.

(21) Appl. No.: 11/474,228

(22) Filed: Jun. 23, 2006

(65) Prior Publication Data

US 2007/0002152 A1    Jan. 4, 2007

Related U.S. Application Data

(63) Continuation of application No. PCT/JP03/16825, filed on Dec. 25, 2003.

(51) Int. Cl.
  *H04N 5/208*    (2006.01)
(52) U.S. Cl. .............. 348/252; 348/208.12; 348/345; 348/349
(58) Field of Classification Search ............... 348/252, 348/349, 208.12, 345
See application file for complete search history.

(56) References Cited

U.S. PATENT DOCUMENTS

2003/0223009 A1 * 12/2003  Yoshida et al. ............. 348/349

FOREIGN PATENT DOCUMENTS

| JP | S 61-251378 | 11/1986 |
| JP | 2000-201287 | 7/2000 |
| JP | 2001-320454 | 11/2001 |
| JP | 2002-48967 | 2/2002 |
| JP | 2002-64745 | 2/2002 |
| JP | 2002-223275 | 8/2002 |
| JP | 2002-287012 | 10/2002 |
| JP | 2003-274258 | 9/2003 |

* cited by examiner

*Primary Examiner*—Jason Chan
*Assistant Examiner*—Usman Khan
(74) *Attorney, Agent, or Firm*—Foley & Lardner LLP

(57) ABSTRACT

There is provided a digital photographic instrument comprising an edge enhancing section which enhances the edge of image data. The instrument determines whether a focus is good or bad and adjusts the degree of edge enhancement in the edge enhancing section according to the result of the determination, thereby giving a sharp photograph. The instrument also shortens time required for focusing by complementing an autofocusing mechanism.

12 Claims, 10 Drawing Sheets

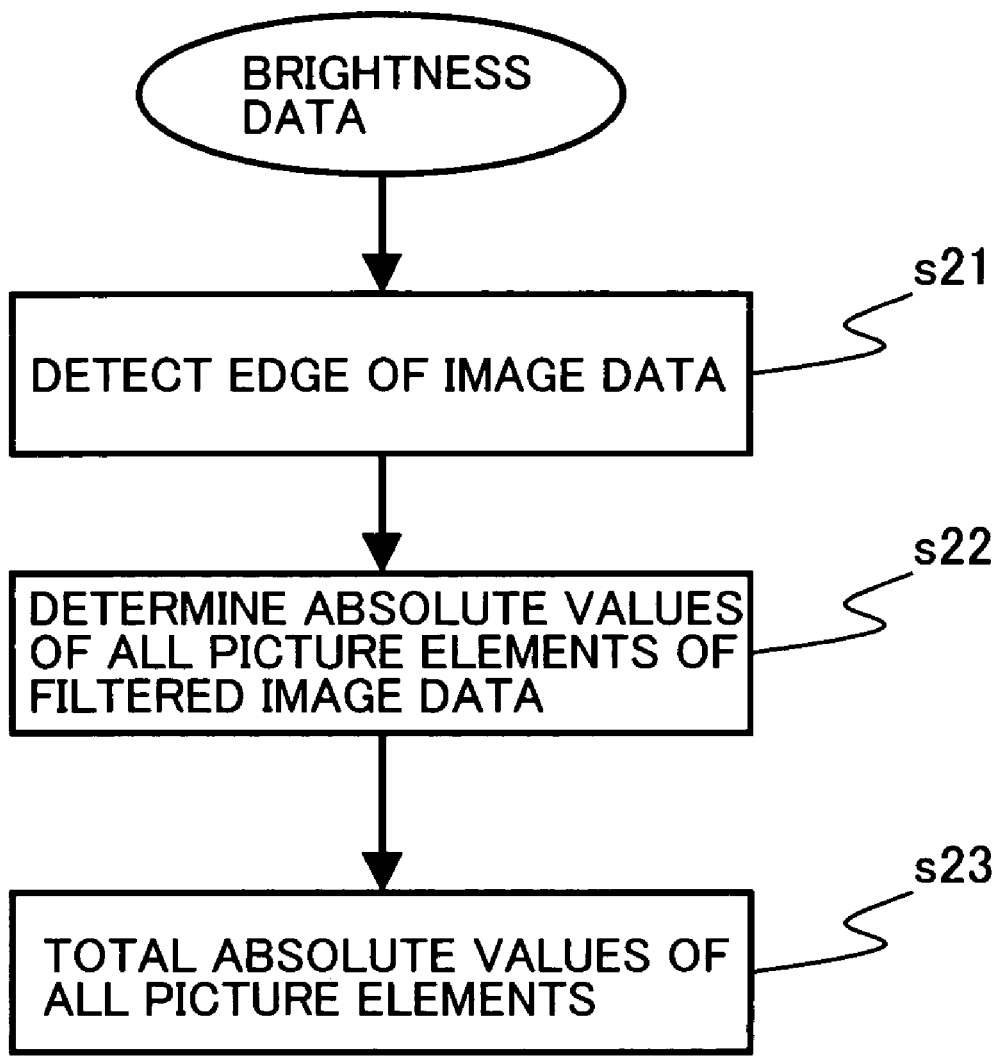

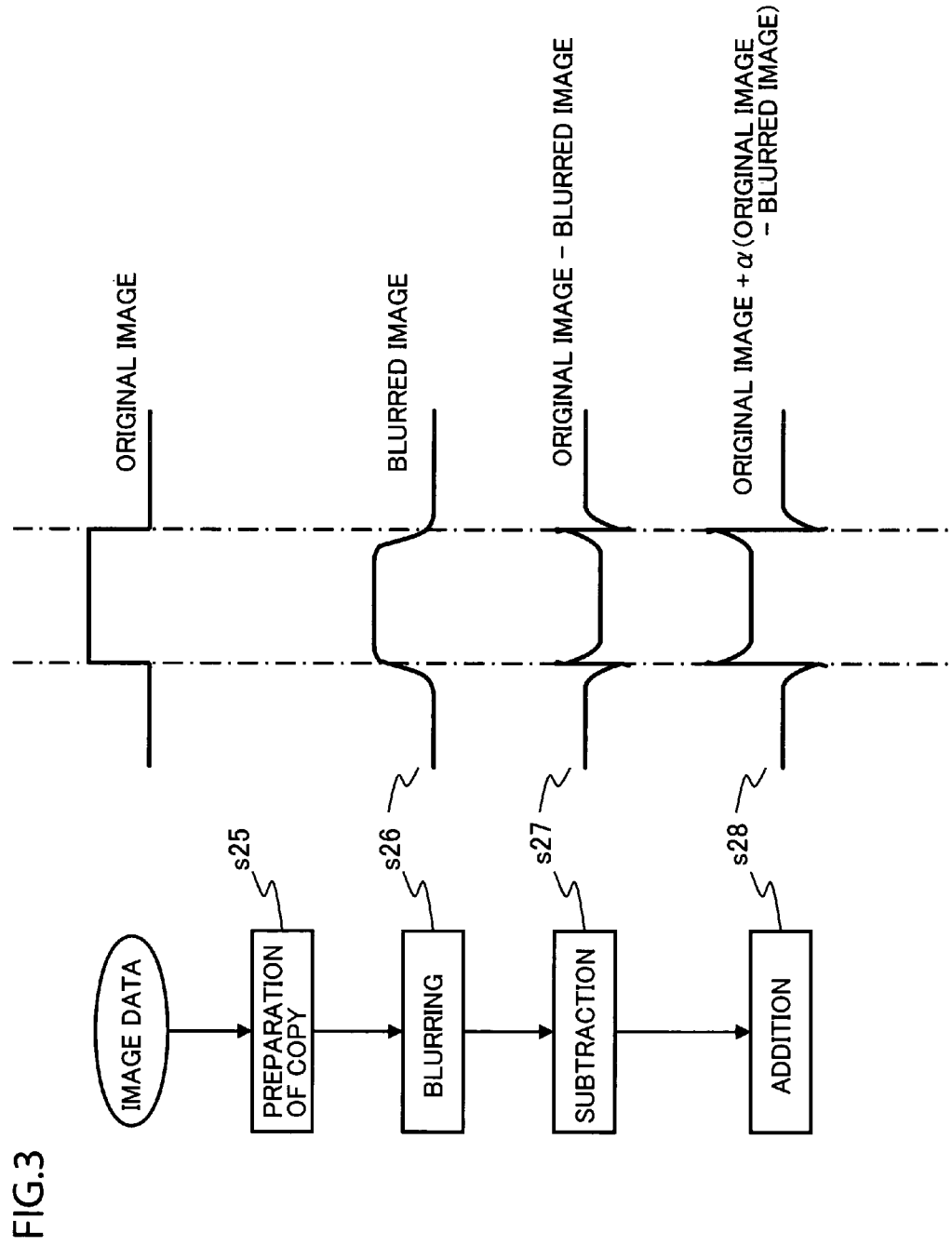

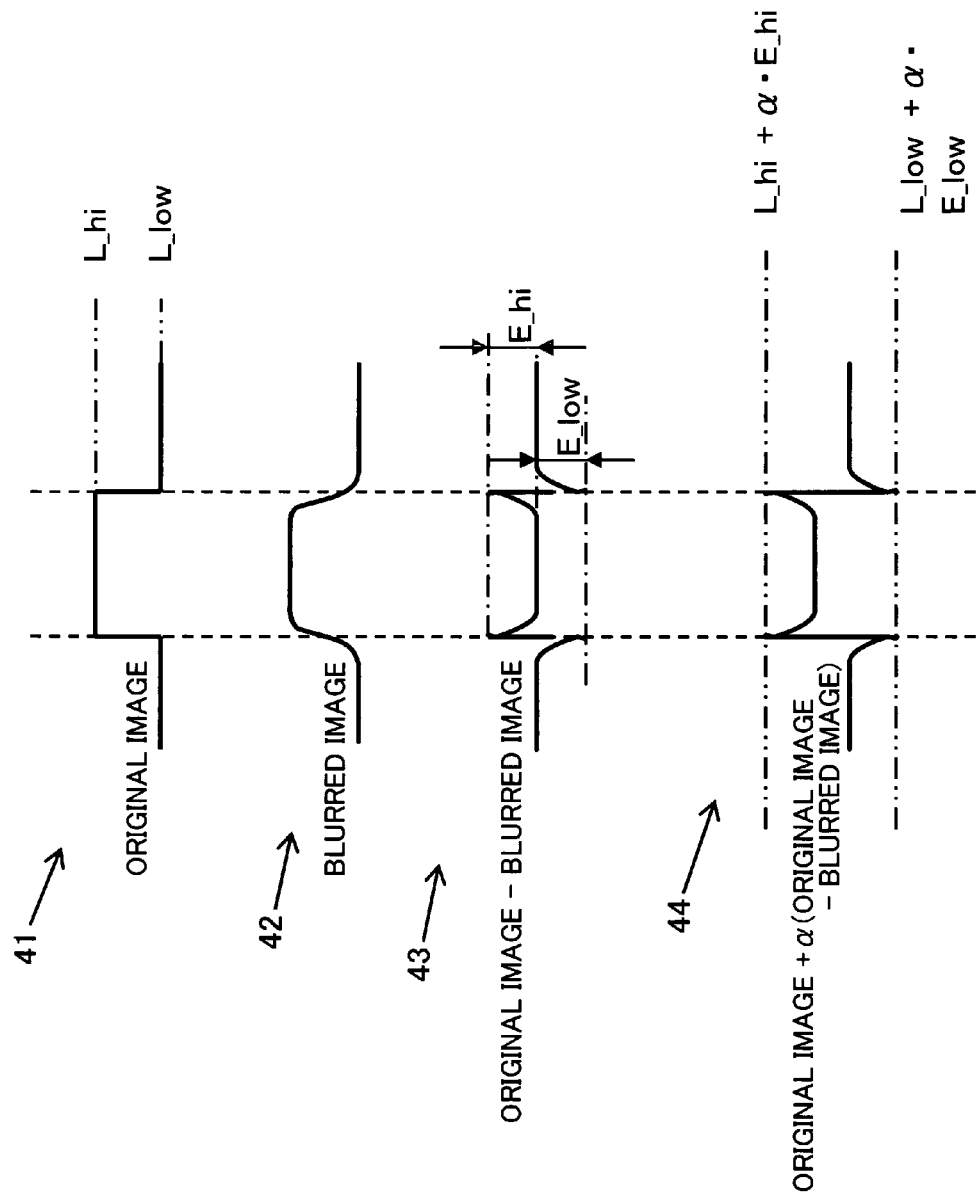

DIGITAL PHOTOGRAPHIC INSTRUMENT, METHOD FOR ADJUSTING FOCUS OF DIGITAL PHOTOGRAPHIC INSTRUMENT, AND PROGRAM FOR DIGITAL PHOTOGRAPHIC INSTRUMENT

CROSS-REFERENCE TO RELATED PATENT APPLICATIONS

The present application is a continuation of PCT Application Serial No. PCT/JP2003/016825, filed on Dec. 25, 2003 and is incorporated herein by reference in its entirety.

BACKGROUND OF THE INVENTION (i) Field of the Invention

The present invention relates to a digital photographic instrument. More specifically, it relates to a method for adjusting the focus of a digital photographic instrument.

(ii) Description of the Related Art

In recent years, a camera is often installed in portable information devices such as a cellular phone and a PDA. Cameras used for such a purpose are provided in the market as camera modules equipped with a small-sized lens and an image sensor such as a CCD or CMOS. Initially, camera modules with a low resolution have been merely installed. However, recently, some of portable information devices are equipped with camera modules having a resolution of higher than 1 megapixel. It is almost certain that camera modules having a higher resolution will be installed in portable information devices in the future.

Meanwhile, a lens must be focused on a subject to take its clear picture. That is, the distance between the lens and an image sensor must be adjusted by the distance between a camera and the subject so that light having passed through the lens connects an image accurately on the image sensor. As a focus adjusting method, in a camera module equipped with an image sensor having a low resolution, a fixed focus method designed such that a lens can be focused over a wide range without moving by setting a great depth of field in advance is often used. However, since the focus must be adjusted more precisely as the resolution of the image sensor becomes high, it is desirable that the distance between the lens and the image sensor be adjusted aggressively by the distance between the camera and the subject.

In the field of general cameras and digital cameras that are devices designed specifically for photographing, an autofocusing function which focuses a lens on a subject automatically has been developed. The autofocusing function is a function of determining an appropriate focus evaluation value while moving the position of a lens gradually and taking a lens position at which the best focus evaluation value has been obtained as a lens position at which the optimum focus is obtained. As a method of determining the evaluation value, there can be named a phase difference detection method which has been used for film single-lens reflex cameras and a contrast method which is used for digital cameras.

To focus a lens on a subject precisely, it is desirable that a focus evaluation value be obtained at a number of lens positions by narrowing the distance between positions between which a lens is moved. However, this requires a long time to focus the lens on a subject and a large amount of power to move the lens. Accordingly, several proposals have been made to shorten time to focus a lens on a subject in a short time.

Japanese Patent Laid-Open Publication No. 2002-287012 describes an invention characterized by determining a focus evaluation value while moving the position of a lens and finding a focused focal position quickly by increasing the moving speed of the lens when the focus evaluation value is larger than or equal to a given threshold and decreasing the moving speed when the focus evaluation value is smaller than the threshold.

Japanese Patent Laid-Open Publication No. 2002-48967 describes an invention characterized by determining a focus evaluation value while moving the position of a lens and finding a focused focal position quickly by changing the width of the moving step of the lens according to the size of the focus evaluation value.

However, even with these conventional techniques, time to focus a lens on a subject is still not sufficient in some cases. In particular, some of camera-equipped cellular phones and PDAs take a photograph in a single-action mode and must complete control of focusing more quickly than cameras which take a photograph in a double-action mode.

The double-action mode is a mode in which preparations for photographing are made when a shutter button is pressed halfway and a photograph is taken when the shutter button is pressed ally the way. The preparations for photographing include automatic exposure control, autofocusing, and white balancing. Since a user generally takes a photograph after completion of the preparations for photographing, it can be said that cameras can take a sufficient time for the preparations for photographing.

In contrast, the single-action mode is a mode in which preparations for photographing and photographing are carried out at the press of a shutter button. If time between press of the shutter button and actual photographing is too long, a photographer and/or a subject move(s) and an out-of-focus picture is liable to be produced, and operational feeling is also unsatisfactory. Accordingly, it is necessary to complete the preparations for photographing quickly. The requirement for focusing speed in the single-action mode is more stringent than that in the double-action mode.

SUMMARY OF THE INVENTION

To solve the above problems, the present invention provides a focus adjusting method which makes it possible to shorten time required for focusing and a digital photographic instrument comprising the method.

The invention provided herein is a digital photographic instrument having an edge enhancing section which enhances the edge of image data, wherein the digital photographic instrument determines whether a focus is good or bad and changes the degree of edge enhancement in the edge enhancing section according to the result of the determination. The digital photographic instrument may determine whether the focus of edge-enhanced image data is good or bad and further change the degree of edge enhancement according to the result of the determination.

The invention provided herein includes the following aspect. That is, one aspect of the present invention is a digital photographic instrument comprising:

an edge enhancing section which enhances the edge of image data, a lens which is movable in the direction of the optical axis, and an image sensor, wherein the digital photographic instrument:

determines a focus evaluation value associated with the validity of a focus at each lens position while moving the position of the lens by a predetermined distance, evaluates the validity of the focus evaluation value at each lens position, and adjusts the degree of edge enhancement in the edge enhancing section according to the focus evaluation value at a lens position at which the best focus evaluation value has been obtained.

In the digital photographic instrument, the focus evaluation value may be associated with the amount of the edge component of an image. Further, the focus evaluation value may be determined from only a region of an image. Further, in the digital photographic instrument, the degree of edge enhancement may be adjusted in view of the focus evaluation values at a plurality of lens positions including the focus evaluation value at the lens position at which the best focus evaluation value has been obtained.

As another prior literature associated with the present invention, Japanese Patent Laid-Open Publication No. 2000-156816 discloses an edge enhancing instrument which is intended to obtain a more natural image by adjusting the degree of edge enhancement according to the distance to a subject and the content of the subject (i.e. whether it is a portrait, a landscape picture, etc.). The present invention is different from the invention described in the literature in that the present invention obtains a shaper photograph by adjusting the degree of edge enhancement according to the validity of a focus, i.e., whether the lens is well focused. Further, in one aspect of the present invention, the digital photographic instrument shortens time required for focusing by complementing an autofocusing mechanism.

In the digital photographic instrument according to the present invention, the magnitude of the predetermined distance may be changed according to the focus evaluation values. In this case, the present digital photographic instrument may have a step 1 and a step 2 which is smaller than the step 1 as the predetermined distance and determine the moving distance of the lens from the step 1 and the step 2 in accordance with the following expression:

$$\text{while} \left( \left| \frac{f_{n+1} - f_n}{f_n - f_{n-1}} \right|_{n \geq 2} > \text{Focus\_Level\_Target\_Ratio} \right)$$
$$\{$$
$$\text{if}$$
$$\left| \frac{f_{n+1} - f_n}{f_n - f_{n-1}} \right|_{n \geq 2} \geq \text{Step\_Change\_Threshold}$$
$$\text{then}$$
$$\quad \text{Step 1}$$
$$\text{else}$$
$$\quad \text{Step 2}$$
$$\}$$

wherein $f_{n+1}$, $f_n$ and $f_{n-1}$ represent the focus evaluation values at the lens positions n+1, n and n−1, respectively, Focus_Level_Target_Ratio represents a threshold for ending movement of the lens, and Step_Change_Threshold represents a threshold for switching between the step 1 and the step 2.

Further, the digital photographic instrument may have a step 1 and a step 2 which is smaller than the step 1 as the predetermined distance and determine the moving distance of the lens from the step 1 and the step 2 in accordance with the following expression:

$$\text{while (!Step 2)}$$
$$\{$$
$$\text{if}$$
$$\left| \frac{f_{n+1} - f_n}{f_n - f_{n-1}} \right|_{n \geq 2} \geq \text{Step\_Change\_Threshold}$$
$$\text{then}$$
$$\quad \text{Step 1}$$
$$\text{else}$$
$$\quad \text{Step 2}$$
$$\}$$

wherein $f_{n+1}$, $f_n$ and $f_{n-1}$ represent the focus evaluation values at the lens positions n+1, n and n−1, respectively, and Step_Change_Threshold represents a threshold for switching between the step 1 and the step 2.

The digital photographic instrument provided by the present invention may perform adjustment of the degree of edge enhancement in the edge enhancing section and photographing by one operation. Further, the digital photographic instrument may have a telephone function. In addition, the digital photographic instrument may be a camera module to be incorporated in a portable information device.

The invention provided herein includes the following aspect. That is, one aspect of the present invention is a focus adjusting method for a digital photographic instrument comprising an edge enhancing section which enhances the edge of image data, a lens which is movable in the direction of the optical axis, and an image sensor, the method comprising:

determining a focus evaluation value associated with the validity of a focus at each lens position while moving the position of the lens by a predetermined distance, evaluating the validity of the focus evaluation value at each lens position, and adjusting the degree of edge enhancement in the edge enhancing section according to the focus evaluation value at a lens position at which the best focus evaluation value has been obtained.

Further, another aspect of the present invention is a program for a digital photographic instrument comprising an edge enhancing section which enhances the edge of image data, a lens which is movable in the direction of the optical axis, an image sensor, and a computer. The program causes the computer to operate in the following manner. That is, the program causes the computer to determine a focus evaluation value associated with the validity of a focus at each lens position while moving the position of the lens by a predetermined distance, evaluate the validity of the focus evaluation value at each lens position, and adjust the degree of edge enhancement in the edge enhancing section according to the focus evaluation value at a lens position at which the best focus evaluation value has been obtained.

BRIEF DESCRIPTION OF THE DRAWINGS

FIG. 2 is a flowchart illustrating an outline of calculation of focus evaluation value.

FIG. 3 is a diagram illustrating an edge enhancing process.

FIG. 4 is a diagram illustrating the edge enhancing process.

DETAILED DESCRIPTION OF THE PREFERRED EMBODIMENTS

Figure 1:
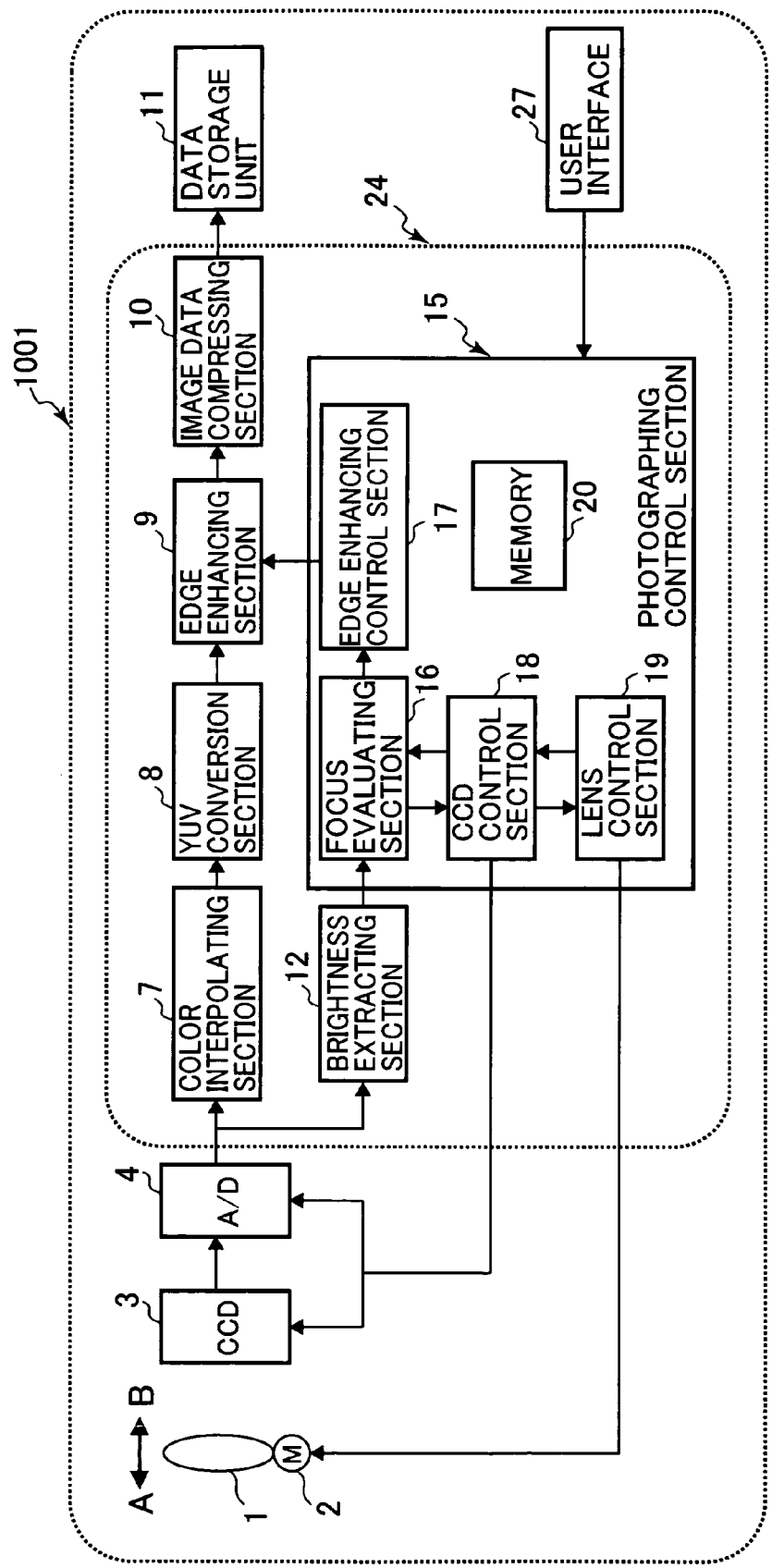
FIG. 1 is a schematic functional block diagram of a digital photographic instrument in one embodiment of the present invention.

Hereinafter, a suitable embodiment of the present invention will be described with reference to the attached drawings. FIG. 1 is a schematic functional block diagram of a digital photographic instrument according to the present invention. A digital photographic instrument 1001 comprises a lens 1, a stepping motor 2 that moves the lens 1 in the A-B direction shown in FIG. 1, a CCD sensor 3 that converts light entering through the lens 1 into an electrical signal, an A/D converter 4 that converts a signal output from the CCD sensor 3 into a digital signal, a color interpolating section 7 that subjects a digitized signal output from the CCD sensor 3 to a color interpolation treatment to prepare image data that can be displayed on a personal computer or printed by a printer, a YUV conversion section 8 that converts image data in an RGB format to a YUV format, an edge enhancing section 9 that enhances the edge of image data, an image data compressing section 10 that compresses image data, and a data storage unit 11 that stores compressed image data. Further, the digital photographic instrument 1001 also comprises a brightness extracting section 12 which extracts a brightness component from a digitized signal output from the CCD sensor 3, a photographing control section 15 which performs various controls with respect to photographing, and a user interface 27 which is used by a user to operate the digital photographic instrument 1001. The photographing control section 15 comprises a focus evaluating section 16 which determines whether a focus is good or bad, an edge enhancing control section 17 which controls the edge enhancing section 9, a CCD control section 18 which controls data collection by the CCD sensor 3, a lens control section 19 which controls movement of the position of the lens, and a memory 20. In a suitable embodiment, it is desirable that the color interpolating section 7, the YUV conversion section 8, the edge enhancing section 9, the image data compressing section 10 and the brightness extracting section be implemented by respective specifically designed hardware circuits and the functions of the photographing control section 15 be implemented by a general-purpose processor such as a CPU, a memory and software stored in the memory. These hardware circuits, CPU and memory can be provided independently as an integrated camera engine 24. The user interface 27 comprises a shutter button and a menu button. By operating the user interface 27A, a user can take a photograph, change photographing resolution and displayed a photograph taken, for example.

The focus evaluating section 16 determines a focus evaluation value which serves as an indicator indicating whether the lens is properly focused, by use of a brightness component extracted by the brightness extracting section 12 from a signal output from the CCD sensor 3. As an example of the focus evaluation value, the amount of the edge component of an image can be used. If the lens is focused, pits and projections on the edge of an image become sharp, while if the lens is not focused, the pits and projections become moderate. Accordingly, the quantity of the edge component can be used as an evaluation value indicating whether the lens is properly focused.

FIG. 2 is a flowchart illustrating an outline of calculation of focus evaluation value in the focus evaluating section 16. First, detection of the edge of image data comprising only a brightness component is performed (STEP s21). To detect the edge, a differential operation is performed and a change in brightness value is detected. Several filters for performing such an operation have been developed and are exemplified by a Sobel filter, a Roberts filter and a Laplace filter. In STEP s22, the absolute values of all picture elements of the filtered image data are determined. In STEP s23, the absolute values of all picture elements are totaled. When the lens is focused, the above total value becomes large because pits and projections on the edge of the image are sharp, while when it is not focused, the total value becomes small. Hence, the above total value can be an indicator for determining whether a focus is good or bad. The processes can be implemented not only by specifically designed circuits but also by a combination of a general-purpose processor and software.

To check whether the lens is focused, use of color image data is not necessarily required, and it is often sufficient to use only one-color image data. Therefore, in the present example, it is checked by use of only the brightness component of image data. However, in other examples, the same focus evaluation can be made by use of a specific color component included in a signal output from the CCD sensor 3, e.g. only a green component. In this case, a circuit that extracts the green color from the signal output from the CCD sensor 3 and supplies it to the focus evaluating section 16 is needed, in place of the brightness extracting section 12.

Although calculation of the focus evaluation value may be performed on data obtained from the whole CCD sensor 3, it may be performed only on data obtained from a portion of the CCD sensor 3. For example, if the calculation is performed only on data obtained from the central region of the CCD sensor 3, a calculation amount required for determining the focus evaluation value is decreased, resulting in a time shortening effect, and a photograph with a focus on a subject situated at the center of the composition can be taken. A user may be allowed to choose on which part of the composition the lens is to be focused. Further, when image data used for calculation of the focus evaluation value is photographed, the calculation amount of the focus evaluation value may be decreased by reducing the resolution of the CCD sensor 3 in advance.

The lens control section 19 moves the lens 1 in the A-B direction shown in FIG. 1 by a predetermined distance by controlling the stepping motor 2. The moving distance of the lens may be constant or variable and may be changed according to focus evaluation values calculated by the focus evaluating section 16. In one embodiment, the digital photographic instrument has a step 1 and a step 2 which is smaller than the step 1 as the predetermined distance and selects either of the step 1 and the step 2 according to a focus evaluation value in accordance with the following expression:

expression 1
$$\text{while}\left(\left|\frac{f_{n+1} - f_n}{f_n - f_{n-1}}\right|_{n \geq 2} > \text{Focus\_Level\_Target\_Ratio}\right)$$
$$\{$$
$$\text{if}$$
$$\left|\frac{f_{n+1} - f_n}{f_n - f_{n-1}}\right|_{n \geq 2} \geq \text{Step\_Change\_Threshold}$$
$$\text{then}$$
$$\quad \text{Step 1}$$
$$\text{else}$$
$$\quad \text{Step 2}$$
$$\}$$

wherein
$f_{n+1}$, $f_n$ and $f_{n-1}$ represent focus evaluation values at lens positions n+1, n and n−1, respectively,
Focus_Level_Target_Ratio represents a threshold for ending movement of the lens, and
Step_Change_Threshold represents a threshold for switching between the step 1 and the step 2.

The digital photographic instrument according to the present invention is preferably so constituted as to perform focusing, adjustment of the degree of edge enhancement and photographing by one operation. That is, it is preferably so constituted as to perform a series of these operations successively by operating a user interface for photographing such as a shutter button only once. In such a constitution, if time between press of the shutter button and actual photographing is too long, a photographer and/or a subject move(s) and an out-of-focus picture is liable to be produced, and operational feeling is also bad. Accordingly, time required for focusing should be made as short as possible. Consequently, it is preferable to move the lens by the smaller distance step 2 only once and complement incomplete focusing with sharpening of image by an edge enhancing process. With such a constitution, the time required for focusing can be rendered shorter. In this case, the moving distance of the lens is controlled in accordance with the following expression.

expression 2
$$\text{while (!Step 2)}$$
$$\{$$
$$\text{if}$$
$$\left|\frac{f_{n+1} - f_n}{f_n - f_{n-1}}\right|_{n \geq 2} \geq \text{Step\_Change\_Threshold}$$
$$\text{then}$$
$$\quad \text{Step 1}$$

-continued
$$\text{else}$$
$$\quad \text{Step 2}$$
$$\}$$

The edge enhancing section 9 enhances the edge of an image. Further, the edge enhancing section 9 can change the degree of edge enhancement under the control of the edge enhancing control section 17. Several methods can be used for edge enhancement. In the present embodiment, the edge enhancing section 9 carries out edge enhancement by use of a method called "unsharp masking". An example of an edge enhancing process will be described by use of FIGS. 3 and 4.

FIG. 3 is a flowchart illustrating an outline of edge enhancing process in the edge enhancing section 9. First, in STEP s25, a copy of original image data is prepared. In STEP s26, the copied original image is subjected to an appropriate smoothing filter to prepare a blurred image. Illustrative examples of the smoothing filter used in this case include a median filter, a Butterworth filter, and a Gaussian filter. In STEP s27, the blurred image is subtracted from the original image. The image resulting from the subtraction is the edge portion. In STEP s28, the above image resulting from the subtraction is multiplied by an appropriate coefficient α and then added to the original image. The larger the α is, the higher the degree of edge enhancement becomes, and the smaller the α is, the lower the degree of edge enhancement becomes. Although such a process can be implemented by a specifically designed circuit, it can also be implemented by a combination of a general-purpose processor and software.

FIG. 4 is a diagram illustrating an example of a method for determining the upper limit of the above α. 41 indicates original image data, and the value of the high brightness portion of this image data is L_hi, and the value of the low brightness portion of this image data is L_low. 42 indicates a blurred image obtained by subjecting the original image to an appropriate smoothing filter, which has been described in STEP s26 of FIG. 3. 43 indicates the edge portion resulting from subtracting the blurred image from the original image, which has been described in STEP s27 of FIG. 3. In the data indicated by 43, the value of the large portion is E_hi, and the value of the small portion is E_low. Accordingly, since an edge-enhanced image is obtained by multiplying the data indicated by 43 by an appropriate coefficient α and adding the product to the data indicated by 41 as described in STEP s28 of FIG. 3, the value of the high brightness portion of the edge-enhanced data is (L_hi+αE_hi), and the value of the low brightness portion of the edge-enhanced data is (L_low+αE_low). Consequently, if the α is determined with the constraint that (L_hi+αE_hi) and (L_low+αE_low) do not exceed the resolution of data, whitening or blackening of edge-enhanced image does not occur. For example, when the resolution of image data is 8 bits, the constraints are (L_hi+αE_hi<=255) and (L_low+αE_low>=0).

The edge enhancing control section 17 will be further described with reference to FIG. 1. The edge enhancing control section 17 adjusts the degree of edge enhancement by the edge enhancing section 9 by adjusting the above coefficient α and parameters of the smoothing filter used in the edge enhancing section 9. When the filter used in the edge enhancing section 9 is a median filter, the parameters are Median Filter Height and Median Filter Width. When the filter is a Butterworth filter, the parameters are Cutoff and Order. When the filter is a Gaussian filter, the parameters are Row Spread Factor and Column Spread Factor. The edge enhancing section 9 and the edge enhancing control section 17 are constituted such that they can adjust at least one of these parameters.

Figure 5A:
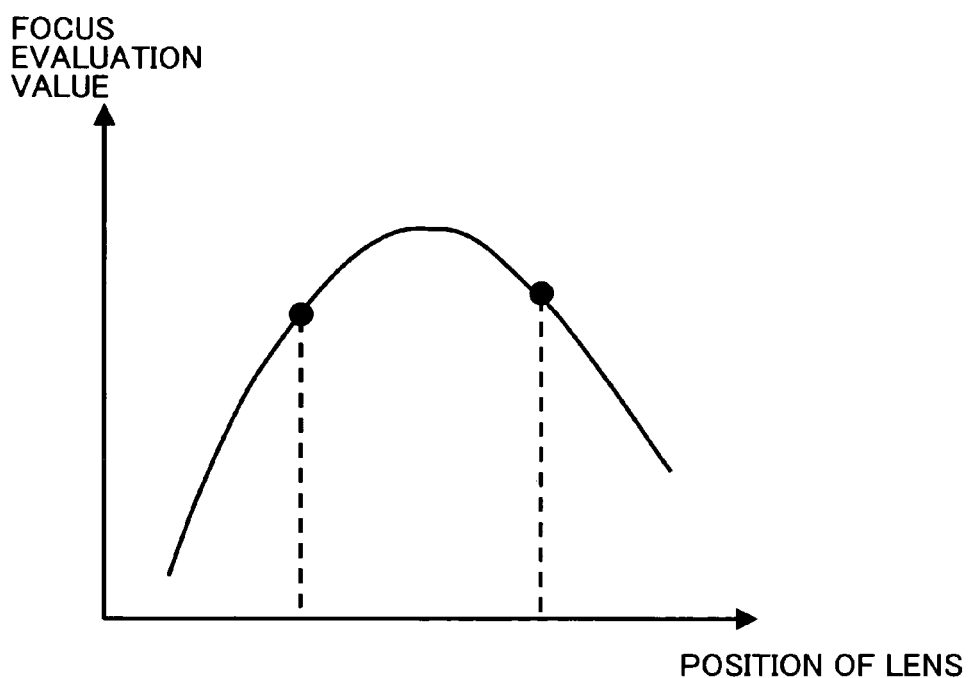
FIG. 5a is a diagram illustrating the edge enhancing process.
Figure 5B:
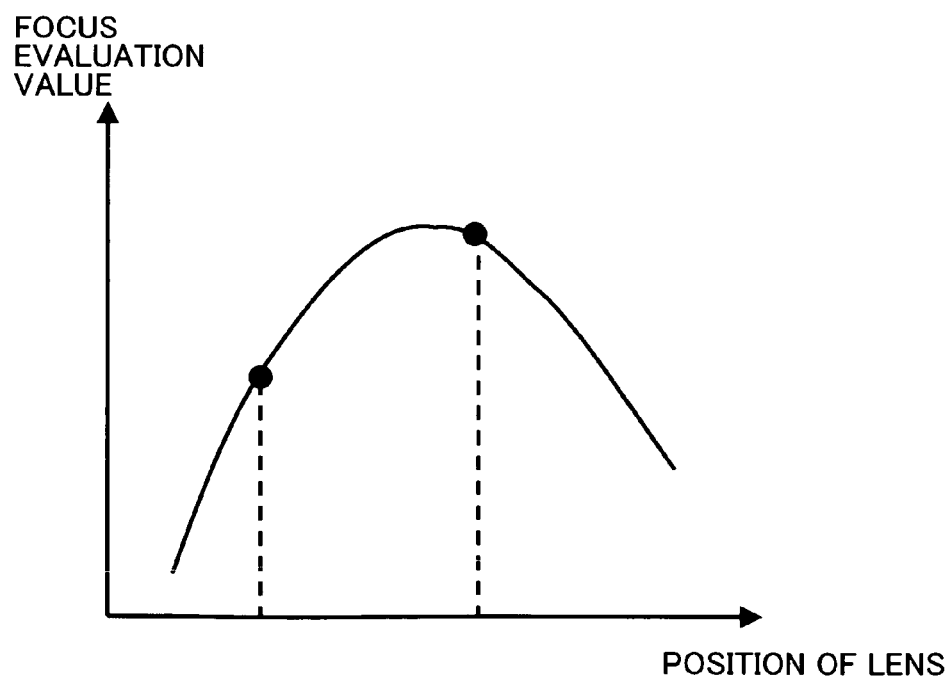
FIG. 5b is a diagram illustrating the edge enhancing process.

The edge enhancing control section 17 may adjust the degree of edge enhancement in view of not only a focus evaluation value at a lens position at which the best focus evaluation value has been obtained but also focus evaluation values at one or more other lens positions. In one embodiment, the edge enhancing control section 17 is so constituted as to determine the degree of edge enhancement from the magnitude relationship between a focus evaluation value 1 at a lens position at which the best focus evaluation value has been obtained and a focus evaluation value 2 at a lens position at which the second best focus evaluation value has been obtained. For example, if the focus evaluation value 1 and the focus evaluation value 2 are nearly the same value, it is conceived that even the lens position at which the best focus evaluation value has been obtained is far from the optimum lens position, so that the above α is rendered large to perform greater edge enhancement (FIG. 5*a*). Meanwhile, if the focus evaluation value 1 and the focus evaluation value 2 are significantly difference values, it is conceived that the lens position at which the best focus evaluation value has been obtained is close to the optimum lens position, so that the above α is rendered small for moderate edge enhancement (FIG. 5*b*). As a matter of course, the parameters of the smoothing filter may be adjusted in place of the α.

Figure 6:
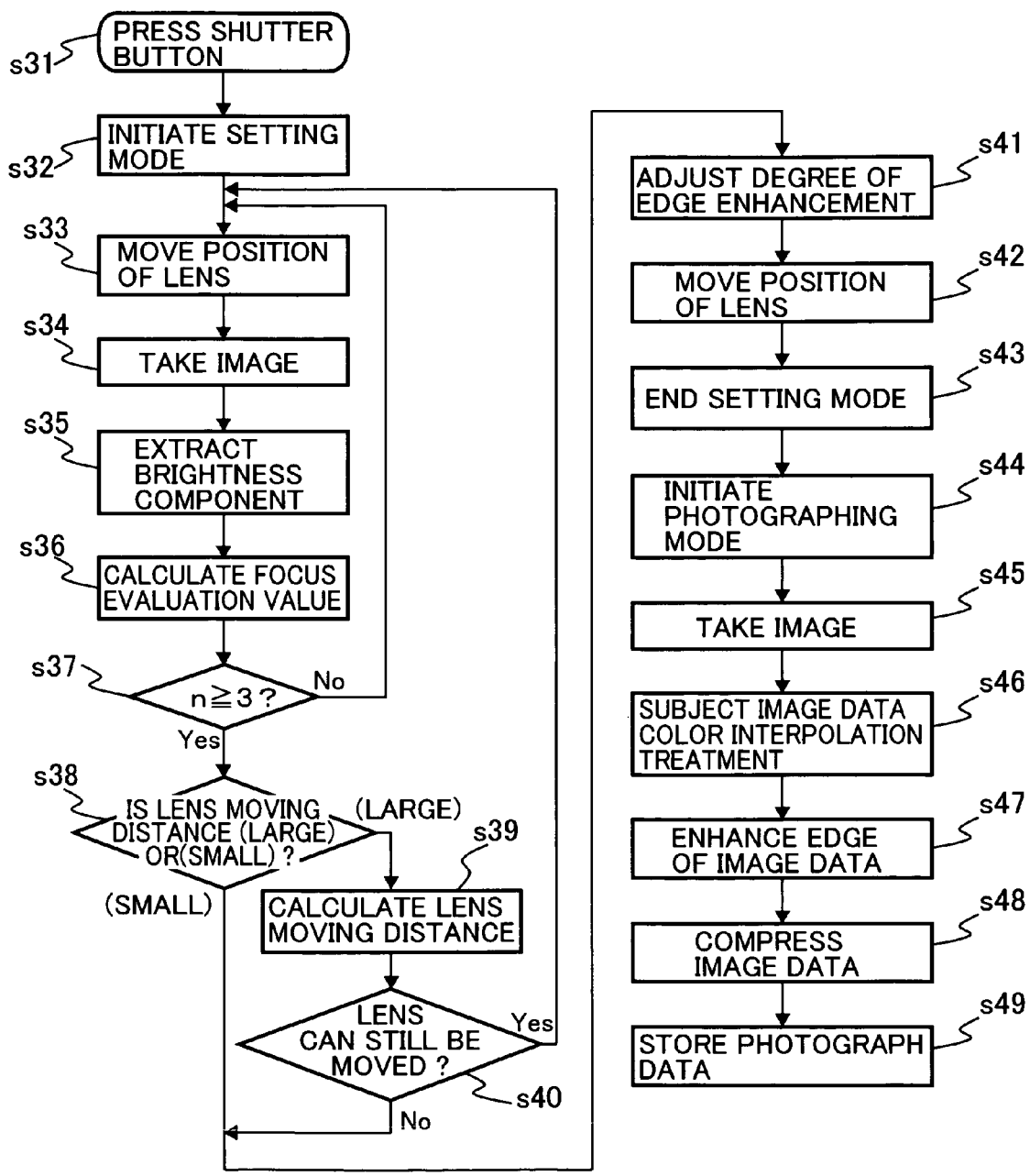
FIG. 6 is a flowchart illustrating an outline of photographing in the present embodiment.

Next, a flow associated with photographing will be described by use of FIG. 6. FIG. 6 is a flowchart illustrating an outline of the photographing operation of the digital photographic instrument according to the present invention. At the press of a shutter button which is a part of the user interface 27 (STEP s31), a setting mode for carrying out focusing and the like is initiated (STEP s32). First, the lens 1 is moved to a predetermined position (STEP s33), and the CCD sensor 3 is driven to take an image so as to obtain a focus evaluation value (STEP s34). Imaging in this step may be carried out at a resolution decreased by thinned-out operation of the CCD sensor 3 so as to shorten data processing time associated with focusing. Then, a brightness component is extracted from the data obtained in STEP s34 by the brightness extracting section 12 (STEP s35), and a focus evaluation value is determined from the extracted brightness component in the manner described above (STEP s36).

If the operations of STEPS s33 to s36 have been carried out only once or twice, it returns to STEP s33, moves the lens by a predetermined distance, takes a new image and calculates a focus evaluation value (No in STEP s37). In this example, either of two moving distances (Large) and (Small) is used to move the lens. When the operations of STEPS s33 to s36 have been carried out less than twice, the moving distance (Large) is used. When the operations of STEPS s33 to s36 have been carried out three times or more, it proceeds to STEP s38 (Yes in STEP s37).

In STEP s38, the subsequent processes are branched depending on whether the most recent lens moving distance is (Large) or (Small). If the moving distance is (Small), it proceeds to STEP s41 to adjust the degree of edge enhancement. The reason why the lens is not moved further when the moving distance is (Small) is to shorten time required for focusing as described above. If the most recent lens moving distance is (Large), the moving distance of the lens is selected from (Large) and (Small) in accordance with the above expression 2 (STEP s39), and it is determined whether the lens can still be moved (STEP s40). If the lens can still be moved, it returns to STEP s33 and moves the position of the lens by the moving distance selected in STEP s39. If the lens can no longer be moved, it proceeds to STEP s41.

In STEP s41, the edge enhancing control section 17 adjusts the degree of edge enhancement by adjusting the parameters of the edge enhancing section 9 based on the focus evaluation value obtained in STEP s36. In addition, the lens is moved to the lens position which gives the best focus evaluation value (STEP s42). After completion of adjustment of the degree of edge enhancement and movement of the position of the lens, the setting mode is ended (STEP s43).

Although not shown, an exposure and a white balance are also adjusted in the setting mode in addition to focusing.

Immediately after completion of the setting mode, a photographing mode which actually prepares a photograph is initiated (STEP s44). First, the CCD sensor 3 is driven to take a photograph, and the obtained data is subjected to a color interpolation treatment to prepare image data which can be displayed on a personal computer (STEP s46). Then, the edge of this image data is enhanced at the degree determined above (STEP s47). Finally, the image data is compressed by a technique such as JPEG (STEP s48) and stored in the data storage unit 11 (STEP s49).

Thus, in the present invention, even if the position of a lens is somewhat displaced from the focused focal point, the incomplete focus can be complemented by an edge enhancing process by changing the degree of the edge enhancing process according to the displacement. Accordingly, it can be said that the present invention is particularly suitable as a focus adjusting method when there is no time to adjust the position of a lens precisely, such as when a photograph is taken in a single-action mode.

Further, since camera-equipped cellular phones and PDAs have various functions such as a telephone function and a mail function in addition to a photographing function, the power consumption of the photographic instrument is desirably as low as possible. However, an autofocusing mechanism consumes a large amount of power. The reason is that focusing looks for a lens position which is the closest to the focused focal point while moving a lens and the amount of power consumed by a stepping motor to move the lens is relatively large in various operations of the photographic instrument. In the present invention, even if adjustment of the position of a lens for focusing is somewhat incomplete, an incomplete focus can be complemented by carrying out an edge enhancing process according to the incompleteness. Consequently, the present invention is also advantageous when power consumed by adjustment of the position of a lens for focusing is desired to be saved.

Figure 7:
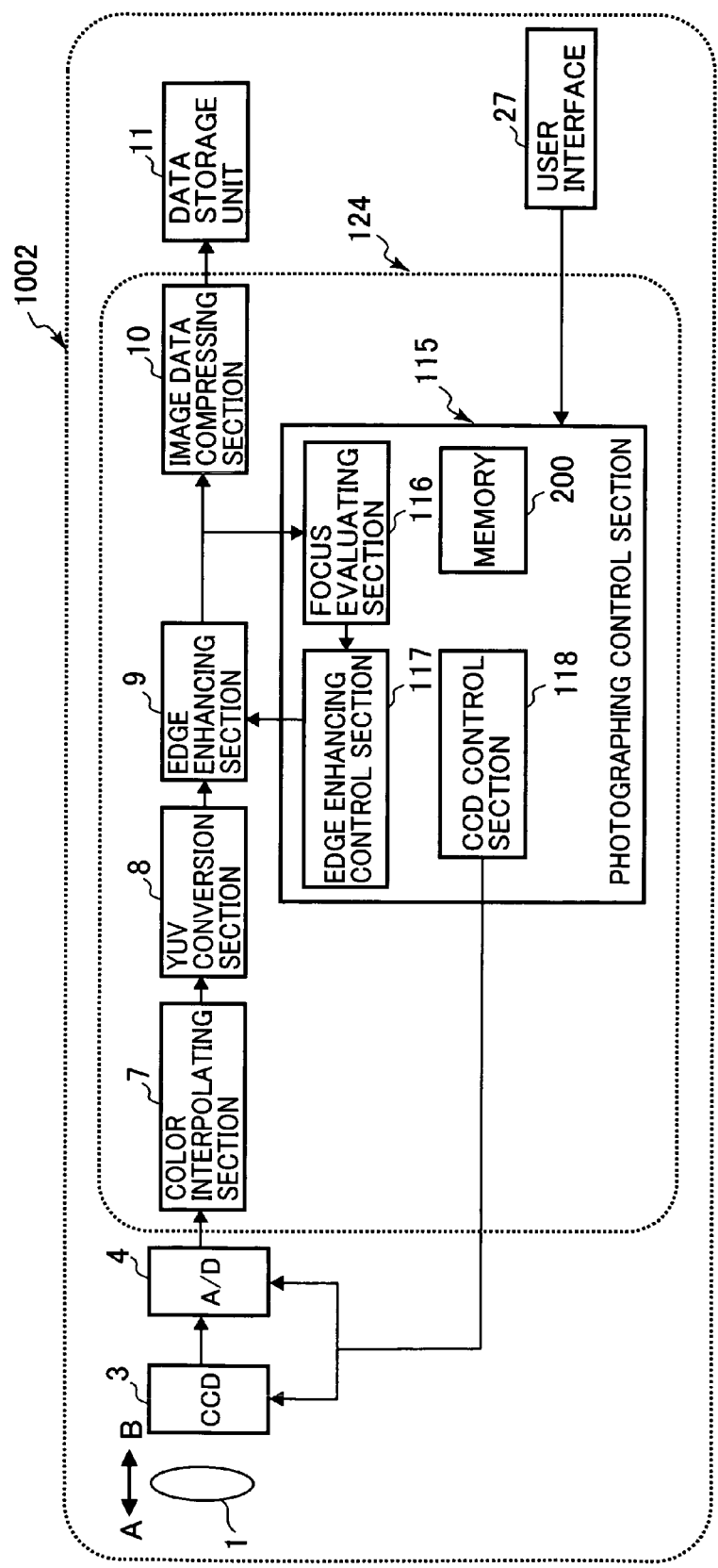
FIG. 7 is a schematic functional block diagram of a digital photographic instrument in another embodiment of the present invention.

Another embodiment of the present invention will be described by use of FIG. 7. FIG. 7 is a schematic diagram illustrating the hardware configuration of digital photographic instrument 1002 in another embodiment of the present invention. The present embodiment comprises the same constituents as those of the embodiment shown in FIG. 1. In the present embodiment, a photographing control section 115 which corresponds to the photographing control section 15 of FIG. 1 performs calculation of focus evaluation value by use of the brightness component of edge-enhanced image data.

Unlike the digital photographic instrument 1001 shown in FIG. 1, the digital photographic instrument 1002 does not have a function of focusing a lens on a subject by adjusting the position of the lens. Instead, the digital photographic instrument 1002 is so constituted as to determine whether the focus of an edge-enhanced image is good or bad and change the degree of edge enhancement according to the result of the determination. Hereinafter, the operation of the digital photographic instrument 1002 will be described.

First, a CCD control section 118 drives a CCD sensor 3 to carry out test imaging, and the obtained data is processed into image data in a YUV format through a color interpolating section 7 and a YUV conversion section 8. The edge of the obtained image data is enhanced in an edge enhancing section 9. Then, a focus evaluating section 116 in the photographing control section 115 acquires the brightness component of the edge-enhanced image and calculates a focus evaluation value with respect to the acquired brightness component. Then, an edge enhancing control section 117 changes the foregoing various parameters in the edge enhancing section 9 according to the validity of the focus evaluation value. Thereafter, test imaging is carried out again, an evaluation of the focus is made, and the various parameters in the edge enhancing section 9 are adjusted. By repeating this process, edge enhancing parameters by which the optimum focus evaluation value is obtained can be determined.

In the present embodiment, an incomplete focus can be complemented by changing the degree of edge enhancement according to the validity of focusing, even when there is no mechanism of focusing a lens on a subject by movement of the lens. Such an embodiment is suited for an inexpensive imaging device which cannot afford to adopt a mechanism of focusing a lens on a subject by movement of the lens.

EXAMPLE 1

Figure 8:
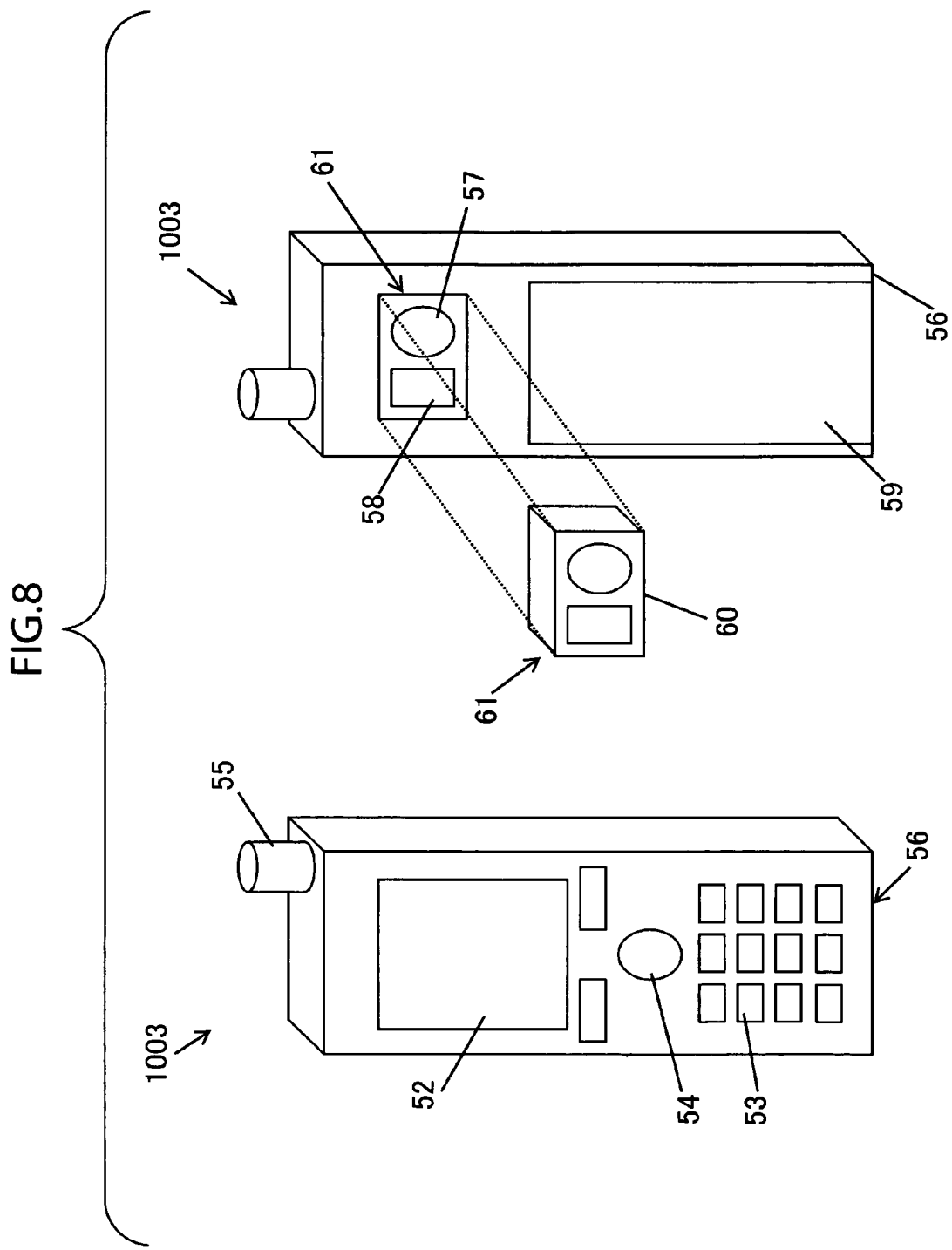
FIG. 8 is a diagram illustrating the appearance of a camera-equipped cellular phone to which the present invention has been applied.

Next, an example in which the present invention has been applied to a camera-equipped cellular phone will be described. FIG. 8 is a schematic diagram illustrating the appearance of a camera-equipped cellular phone using the present invention.

A camera-equipped cellular phone 1003 comprises a display 52, a keypad 53, a function button 54 and an antenna 55 on its front surface and comprises a camera section 61 and a battery cover 59 on its rear surface. The camera-equipped cellular phone 1003 further comprises a case 56 that holds the above constituents together. The camera-equipped cellular phone 1003 is small and light and has size and weight suited to be held in one hand or carried in a handbag. The function button 54 is used to make or receive a phone call or as a shutter button at the time of photographing. When a phone call has reached the camera-equipped cellular phone 1003, a user can answer the phone call by pressing the function button 54. Further, when a user takes a photograph, the user holds the camera-equipped cellular phone 1003 with a lens 57 pointed at a subject and checks a preview image taken by a camera module 61 on the display 52. Then, a picture is taken at the press of the function button 54, and image data prepared by photographing is stored in a recording device provided in the camera-equipped cellular phone 1003.

The camera section 61 comprises a light entering section 57 and LED lighting 58 and is constituted as a camera module having an independent case 60. Accordingly, the camera-equipped cellular phone 1003 can be divided into the camera module 61 and the remaining portion (host module). By constituting the camera section as an independent module as described above, the camera module can have versatility and can be combined with other cellular phone or PDA easily. Consequently, it becomes possible to sell the camera module as an independent product.

Figure 9:
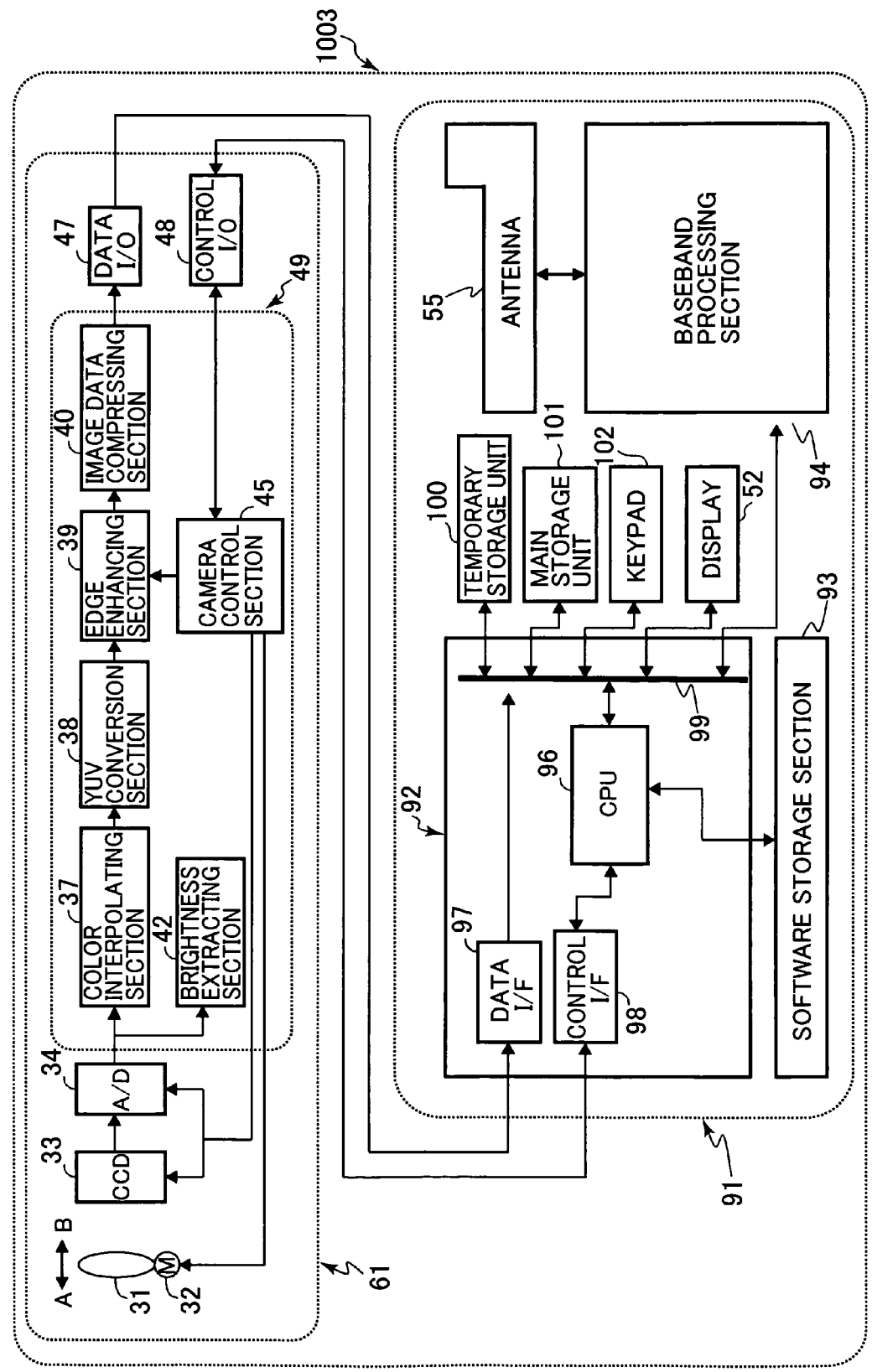
FIG. 9 is a schematic diagram illustrating the hardware configuration of the camera-equipped cellular phone according to the present invention.

FIG. 9 is a schematic diagram illustrating the hardware configuration of camera-equipped cellular phone 1003. The camera-equipped cellular phone 1003 comprises a camera module 61 which takes a photograph and provides image data and a host module 91 which has a recording medium for storing the image data and has a telephone function or a PDA function. The camera module 61 comprises a lens 31, a stepping motor 32 that moves the lens 31 in the A-B direction shown in FIG. 9, a CCD sensor 33 that converts light entering through the lens 31 into an electrical signal, an A/D converter 34 that converts a signal output from the CCD sensor 33 into a digital signal, a color interpolating section 37 that subjects a digitized signal output from the CCD sensor 33 to a color interpolation treatment to prepare image data that can be displayed on a personal computer or printed by a printer, a YUV conversion section 38 that converts image data in an RGB format to a YUV format, an edge enhancing section 39 that enhances the edge of image data, an image data compressing section 40 that compresses image data, a brightness extracting section 42 that extracts a brightness component from a digitized signal output from the CCD sensor 33, and a data I/F 47 that sends image data to the host module 91. Further, the camera module 61 comprises a camera control section 45 which corresponds to the photographing control section 15 of FIG. 1 and a control I/F 48 which exchanges control information between the camera control section 45 and the host module. The camera control section 45 is constituted by a general-purpose processor, a memory and software stored in the memory and controls functions associated with photographing, adjustment of focus and adjustment of the edge enhancing section 39 as well as communication with the host module 91. In a suitable embodiment, it is desirable that the color interpolating section 37, the YUV conversion section 38, the edge enhancing section 39, the image data compressing section 40 and the brightness extracting section 42 be implemented by respective specifically designed hardware circuits and the functions of the camera control section 45 be implemented by a general-purpose processor such as a CPU, a memory and software stored in the memory. These hardware circuits and the camera control section can be provided independently as an integrated camera engine 49.

The host module 91 comprises an application engine 92, a software storage section 93 which stores software for operating the application engine 92, a baseband processing section 94 which controls a telephone function, and an antenna 55. The application engine 92 comprises a CPU 96, a data I/F 97 which receives image data sent from the camera module 61, a control I/F 98 which exchanges control information between the CPU 96 and the camera module 61, and a bus 99. A temporary storage unit 101, a main storage unit 101, a keypad 102 and a display 52 are connected to the application engine 92 via the bus 99.

Figure 10:
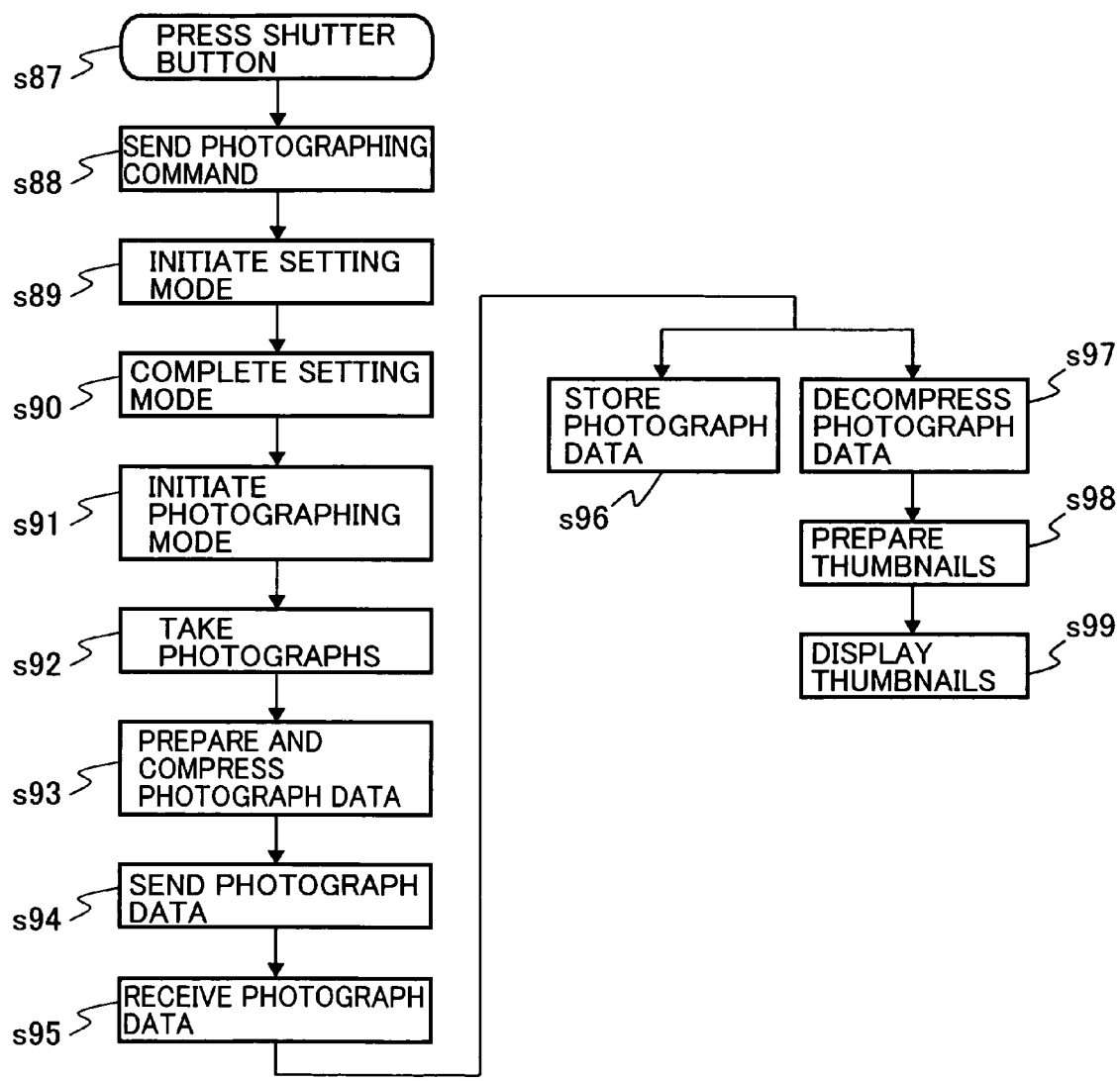
FIG. 10 is a flowchart illustrating an outline of photographing by the camera-equipped cellular phone to which the present invention has been applied.

The operation of the camera-equipped cellular phone 1003 will be described by use of FIG. 10. When a shutter button is pressed down in STEP s87, the CPU 96 in cooperation with the software stored in the software storage section 93 sends a photographing command to the camera module 61 through the control I/F interface 98 (STEP s88). A key in the keypad 102 serves as the shutter button.

After receiving the photographing command from the host module 91 through the control I/F 48, the camera control section 45 initiates a setting mode in STEP s89. Operations in the setting mode are the same as those in STEPS s32 to s42 of FIG. 5. Immediately after completion of the setting mode in STEP s91, the camera control section 45 initiates a photographing mode. In STEP s92, the CCD sensor 33 is driven to take photographs. In STEP s93, photograph data is prepared from a signal output from the CCD sensor 3 and compressed. The operations in STEP s93 are described in detail in STEPS s46 to s48 of FIG. 5. In STEP s94, the camera module 61 sends the photograph data to the host module 91 through the data I/F 47.

In STEP s95, the host module 91 receives the compressed photograph data through the data I/F 97. The received photograph data is stored in the temporary storage unit 100. In STEP s96, the CPU 96 in cooperation with the software stored in the software storage section 93 stores the compressed photograph data stored in the temporary storage unit 100 in the main storage unit 101. In STEP s97, the compressed photograph data stored in the temporary storage unit 100 is decompressed. In STEP s98, thumbnails are prepared from the decompressed photograph data. In STEP s99, the thumbnails are displayed on the display 52. The operations in STEPS s97 to s99 are controlled by the CPU 96 in cooperation with the software stored in the software storage section 93.

In the present invention, even if the position of a lens is somewhat displaced from the focused focal point, the incomplete focus is complemented by an edge enhancing process by changing the degree of the edge enhancing process according to the displacement. Therefore, according to the present invention, since a photograph with a sharp edge can be taken even when there is no time to adjust the position of a lens precisely, time required for focusing can be shortened.

Suitable embodiments of the present invention have been so far described. It is needless to say that the embodiments described above are mere examples for practicing the present invention and the present invention is not limited to these embodiments and can take various embodiments within the scope of the present invention.

What is claimed is:

1. An instrument comprising:
a lens that is movable in the direction of an optical axis;
an edge enhancing section which enhances an edge of image data from a signal obtained by the lens;
an extracting section that extracts a component from the signal; and
a photographing control section which performs controls with respect to photographing, the photographing control section comprising:
a focus evaluating section that determines a focus evaluation value and a lens control section which moves the lens by a predetermined distance, the predetermined distance including a first distance and a second distance which is smaller than the first distance, and the lens being moved by either of the first distance and the second distance which is selected according to the focus evaluation value; and
the photographing control section, when it has been determined that the lens is not focused even after a number of movements of the lens exceeds a predetermined number and when a most recent lens moving distance is the second distance, adjusting the degree of edge enhancement without moving the lens any further, and when it has been determined that the lens is not focused even after the number of movements of the lens exceeds the predetermined number and when the most recent lens moving distance is the first distance, selecting either of the first distance and the second distance to move the lens, wherein if the lens cannot be moved, adjusting the degree of edge enhancement.

2. The instrument of claim 1, wherein the focus evaluation value is associated with the amount of an edge component of an image.

3. The instrument of claim 1, wherein the focus evaluation value is determined from only a region of an image.

4. The instrument of claim 1, wherein the degree of edge enhancement is adjusted in view of focus evaluation values at a plurality of lens positions including the focus evaluation value at the lens position at which a best focus evaluation value has been obtained.

5. The instrument of claim 1, wherein the magnitude of the predetermined distance is changed according to focus evaluation values.

6. The instrument of claims 1, wherein the moving distance of the lens from the first distance and the second distance is determined in accordance with the following expression before the number of movements of the lens exceeds the predetermined number:

$$\text{while} \left( \left| \frac{f_{n+1} - f_n}{f_n - f_{n-1}} \right|_{n \geq 2} > \text{Focus\_Level\_Target\_Ratio} \right)$$
$$\{$$
$$\text{if}$$
$$\left| \frac{f_{n+1} - f_n}{f_n - f_{n-1}} \right|_{n \geq 2} \geq \text{Step\_Change\_Threshold}$$
$$\text{then}$$
$$\quad \text{first distance}$$
$$\text{else}$$
$$\quad \text{second distance}$$
$$\}$$

wherein
$f_{n+1}$, $f_n$ and $f_{n-1}$ represent focus evaluation values at the lens positions n+1, n and n−1, respectively,
Focus_Level_Target_Ratio represents a threshold for ending movement of the lens, and
Step_Change_Threshold represents a threshold for switching between the first distance and the second distance.

7. The instrument of claim 1, wherein the moving distance of the lens from the first distance and the second distance is determinded in accordance with the Following expression after the number of movements of the lens exceeds the predeterminded number:

$$\text{while (!second distance)}$$
$$\{$$
$$\text{if}$$
$$\left| \frac{f_{n+1} - f_n}{f_n - f_{n-1}} \right|_{n \geq 2} \geq \text{Step\_Change\_Threshold}$$
$$\text{then}$$
$$\quad \text{first distance}$$
$$\text{else}$$
$$\quad \text{second distance}$$
$$\}$$

wherein
$f_{n+1}$, $f_n$ and $f_{n-1}$ represent focus evaluation values at the lens positions n+1, n and n−1, respectively, and
Step_Change_Threshold represents a threshold for switching between the first distance and the second distance.

8. The instrument of claim 1, further being configured to perform adjustment of the degree of edge enhancement in the edge enhancing section and photographing by one operation.

9. The instrument of claim 1, further being configured to have a telephone function.

10. The instrument of claim 1, being embodied in a camera module to be incorporated in a portable device.

11. A method used in a digital photographic instrument comprising:

enhancing, via an edge enhancing section, an edge of image data from a signal obtained by a lens, the lens being movable in the direction of an optical axis;

extracting, via an extracting section, a component from the signal; and performing controls with respect to photographing via a photographing control section, the performing of the controls comprising:

determining, via a focus evaluating section, a focus evaluation value;

moving the lens by a predetermined distance via a lens control section, the predetermined distance including a first distance and a second distance which is smaller than the first distance, the lens being moved by either of the first distance and the second distance which is selected according to the focus evaluation value, wherein adjustingof the degree of edge enhancement without moving the lens any further occurs upon a determination that the lens is not focused even after a number of movements of the lens exceeds a predetermined number and when the most recent lens moving distance is the second distance, moving of the lens occurs based upon selection of either of the first distance and the second distance to move the lens if the lens is not focused even after the number of movements of the lens exceeds the predetermined number and when the most recent lens moving distance is the first distance, and adjusting of the degree of edge enhancement occurs if the lens cannot be moved.

12. A computer program product, embodied on a non-transitory computer-readable medium, for execution within a digital photographic instrument, comprising:

computer code configured to enhance, via an edge enhancing section, an edge of image data from a signal obtained by a lens, the lens being movable in the direction of an optical axis;

computer code configured to extract, via an extracting section, a component from the signal; and computer code configured to perform controls with respect to photographing via a photographing control section, the computer code configured to perform the controls further comprising:

computer code configured to determine, via a focus evaluating section, a focus evaluation value;

computer code configured to move the lens by a predetermined distance via a lens control section, the predetermined distance including a first distance and a second distance which is smaller than the first distance, the lens being moved by either of the first distance and the second distance which is selected according to the focus evaluation value, wherein adjustment of the degree of edge enhancement without moving the lens any further occurs upon a determination that the lens is not focused even after a number of movements of the lens exceeds a predetermined number and when the most recent lens moving distance is the second distance, movement of the lens occurs based upon selection of either of the first distance and the second distance to move the lens if the lens is not focused even after the number of movements of the lens exceeds the predetermined number and when the most recent lens moving distance is the first distance, and adjustment of the degree of edge enhancement occurs if the lens cannot be moved.

\* \* \* \* \*